Jan. 13, 1925.
J. E. PETTERSSON
PAN LIFTER
Filed Feb. 13, 1924
1,522,835
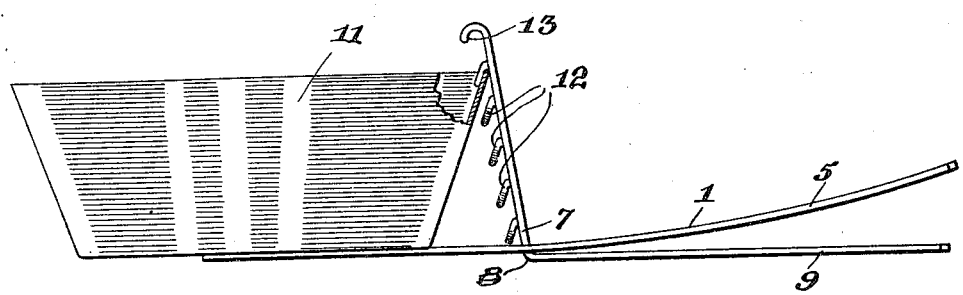
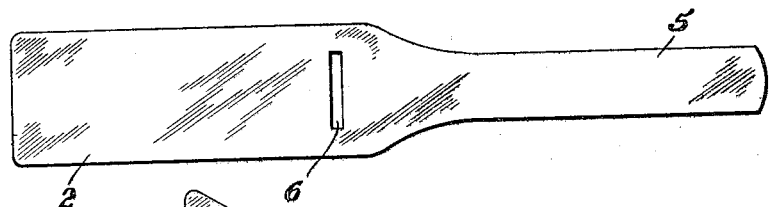
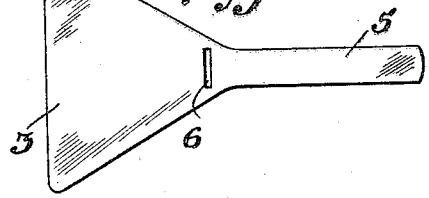
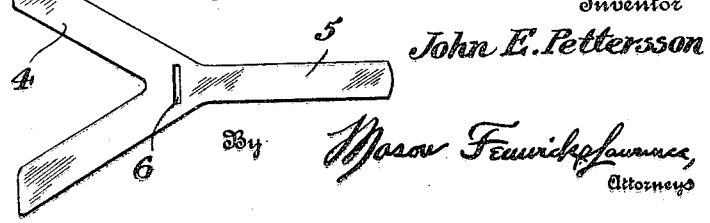
Inventor
John E. Pettersson
By Mason Fenwick & Lawrence,
Attorneys Patented Jan. 13, 1925.

1,522,835

UNITED STATES PATENT OFFICE.

JOHN E. PETTERSSON, OF SCRANTON, PENNSYLVANIA.

PAN LIFTER.

Application filed February 13, 1924. Serial No. 692,532.

*To all whom it may concern:*

Be it known that I, JOHN E. PETTERSSON, a subject of Gustav V of Sweden, residing at Scranton, in the county of Lackawanna and State of Pennsylvania, have invented certain new and useful Improvements in Pan Lifters; and I do hereby declare the following to be a full, clear, and exact description of the invention, such as will enable others skilled in the art to which it appertains to make and use the same.

This invention relates to an improvement in culinary devices and more particularly to a pan lifter for use in lifting hot pans from place to place.

An object of the invention is to provide a pan lifter which will readily adapt itself to the efficient lifting of hot pans of different sizes.

A further object of the invention is to provide a hot pan lifter which will be highly efficient in use and quite inexpensive to manufacture.

Others objects of the invention will appear as the description proceeds.

In the accompanying drawings which form a part of my application, Fig. 1 is a side elevation of my improved pan lifter showing the same operatively engaging a pan.

Fig. 2 is a plan view of my preferred form of clamping bar.

Fig. 3 is a plan view of one form of pan supporting member.

Fig. 4 is a slight modification of the pan supporting member; and

Fig. 5 is a second modification of the pan supporting member.

Like characters of reference are used throughout the following specification and the accompanying drawings to designate corresponding parts. My improved pan lifter comprises a pan supporting member 1 which may have its main body portion formed substantially rectangularly as at 2, triangularly as at 3, or V-shaped as at 4, or in any desired shape. The handle portion 5 will be formed integrally with the body portion of the pan supporting member, and the said body portion will be provided with a notch or slot 6 through which the pan engaging or clamping bar 7 is adapted to extend.

The bar 7 is bent as at 8 in such a manner that the handle portion 9 thereof will be disposed below the handle 1 of the pan supporting member, while the body portion 10 of the bar will extend up through the slot 6 to engage the upper periphery of a pan 11. The body portion 10 of the bar 7 is suitably stamped out to provide a plurality of clamping ears or lugs 12 which are suitably spaced along the length of the said body portion to engage and clamp over the upper periphery of different heights of pans. The upper end of the body portion 10 of the clamping bar 7 is hook-shaped as at 13, and may engage the upper periphery of a pan or may be used as a means to support the pan lifter when not in use. The lowest ear 12 on the clamping bar 7 rests upon and contacts with the upper parts of the pan supporting member 1, and is so positioned as to provide a flat arm for causing a clamping action between the pan supporting member and the clamping bar when the handle members are compressed.

From the foregoing description it will be apparent that the operation of my improved pan lifter will be as follows: The body portion of the pan supporting member is inserted beneath the bottom of the pan and the upper periphery of said pan is engaged by one of the ears or lugs 12, depending upon the height of the pan, and by squeezing the two handle portions 5 and 9 together, the pan will be securely supported so that the same may be removed from a hot stove without danger of burning the hands.

It will be understood that while I have described my preferred form of hot pan lifter I do not intend to limit myself to the exact construction as many minor changes in detail of construction may be resorted to without departure from the spirit of my invention.

Having thus described my invention, what I claim as new and desire to secure by Letters Patent of the United States is:

A pan lifter comprising a pan supporting member, a handle formed integrally thereon, said member being provided with a bearing slot, a clamping bar comprising a main body portion and a handle adapted to extend through said bearing slot with said handle disposed beneath the handle on said supporting member, a plurality of spaced clamping ears punched from the body portion of said clamping bar, adapted to engage the upper periphery of a pan when supported on said supporting member, the lowermost ear on said clamping bar being adapted to rest on the upper surface of said supporting member and to provide a fulcrum for causing a clamping action between said pan supporting member and said clamping bar when said handle members are compressed.

In testimony whereof I affix my signature.

JOHN E. PETTERSSON.